US00RE39839E

(19) United States
(12) Reissued Patent
Wheatley et al.

(10) Patent Number: US RE39,839 E
(45) Date of Reissued Patent: Sep. 18, 2007

(54) CARBON FIBER REINFORCEMENT SYSTEM

(76) Inventors: Donald G. Wheatley, 4451 Ford Rd., Ann Arbor, MI (US) 48105; Donald E. Wheatley, 1119 Wright St., Ann Arbor, MI (US) 48105

(21) Appl. No.: 11/085,795

(22) Filed: Mar. 21, 2005

Related U.S. Patent Documents

Reissue of:
(64) Patent No.: 6,692,595
Issued: Feb. 17, 2004
Appl. No.: 10/171,416
Filed: Jun. 13, 2002

U.S. Applications:
(63) Continuation-in-part of application No. 09/903,414, filed on Jul. 11, 2001, now Pat. No. 6,846,537, which is a continuation-in-part of application No. 09/736,853, filed on Dec. 13, 2000, now Pat. No. 6,746,741.

(51) Int. Cl.
*B32B 5/12* (2006.01)

(52) U.S. Cl. ..... 156/71; 156/247; 156/285
(58) Field of Classification Search ..... 156/71, 156/247, 249, 285, 574, 575, 578
See application file for complete search history.

(56) References Cited

U.S. PATENT DOCUMENTS

| | | | | |
|---|---|---|---|---|
| 4,916,874 | A | 4/1990 | McCoy et al. | |
| 5,635,263 | A | 6/1997 | Saito | |
| 5,640,825 | A | 6/1997 | Ehsami et al. | |
| 5,649,398 | A | 7/1997 | Isley, Jr. et al. | |
| 5,845,450 | A | 12/1998 | Larsen | |
| 5,894,003 | A | 4/1999 | Lockwood | |
| 6,145,260 | A | 11/2000 | Morton | |
| 6,263,629 | B1 | 7/2001 | Brown, Jr. | 52/309.16 |
| 6,418,684 | B1 | 7/2002 | Morton | 52/293.2 |

OTHER PUBLICATIONS

ACI Structural Journal, Technical Paper, Title No.91–S17, Mar.–Apr. 1994, "Strengthening of Initially Loaded Reinforced Concrete Beams Using FRP Plates," by Alfarabi Shari, G.J. Al–Sulaimani, I.A. Basunbuil, M.H. Baluch and B.N. Ghaleb.

ACI Structural Journal, Technical Paper, Title No. 91–S34, May–Jun. 1994, "Fiber Composites for New and Existing Structure, " By Hamid Saadatmanesh.

*Primary Examiner*—James Sells
(74) *Attorney, Agent, or Firm*—Harness, Dickey & Pierce, P.L.C.

(57) ABSTRACT

An article and method for reinforcing structural members is provided. The article includes a carbon fiber material, preferably a carbon fiber mesh with a roughened surface defined by an epoxy resin. The article has lateral fibers woven into longitudinal carbon fibers that are in tension, creating a mesh. An epoxy resin is applied to the fiber mesh to form a [rigidified] *rigified* fiber mesh tape once the resin is cured. To obtain a roughened surface, a plastic sheet is removably attached to the surface of the fiber mesh. The plastic sheet is removed thereby exposing a roughened carbon fiber surface defined by the epoxy. An alternative tensile tape is also provided for reinforcing a wall structure.

17 Claims, 6 Drawing Sheets

CARBON FIBER REINFORCEMENT SYSTEM

Matter enclosed in heavy brackets [ ] appears in the original patent but forms no part of this reissue specification; matter printed in italics indicates the additions made by reissue.

CROSS-REFERENCE TO RELATED APPLICATIONS

This application is a continuation-in-part application of application Ser. No. 09/903,414, filed Jul. 11, 2001 which is a continuation-in-part application of application Ser. No. 09/736,853 filed on Dec. 13, 2000.

BACKGROUND OF THE INVENTION

This invention relates to a product for use in reinforcing structures and a method for attaching the product to the structure and in particular to reinforce concrete walls using carbon fiber material with epoxy adhered to the carbon fiber material. The invention further includes a rigidified mesh of carbon fiber material designed for adherence to a structural element.

DESCRIPTION

Walls constructed of concrete blocks are well known in the field of construction and have been extensively used for both above ground and basement walls. Such concrete walls constructed in this manner are generally capable of supporting residential and light commercial structures and are relatively inexpensive to manufacture and repair.

In order to construct a concrete wall, individual blocks are laid end to end and successive rows or courses are stacked thereon. Mortar between each adjacent block and row secures the wall together. These walls are such that they have excellent compressive strength to support structures placed upon them. However, these walls are inherently weak with respect to lateral loads and are particularly susceptible to cracking from water pressure. This inherent weakness of concrete walls is attributable to the structural characteristics of the concrete walls themselves and the mortar joints at which they are connected. Walls constructed in this manner are relatively strong in compression and are thus well suited for supporting overlying structures. However, both the concrete material and particularly the mortar joints are weak in tension, and when subjected to a tensile force, they tend to separate relatively easily.

Water penetrating deeply into the soil adjacent a basement wall causes substantial lateral movement of the expanding soil against the wall. Over a period of time, block or concrete walls develop diagonal cracks at the ends and vertical cracks near their centers. Such cracks can admit water under pressure from the surrounding soil, and, if left untreated, can progressively widen and eventually facilitate collapse of the entire structure with resultant damage to the structure supported on it. In addition to developing such cracks, concrete walls typically either bow inwardly and such bowing or tilting steadily worsens with the weight of the overflying structure. The water pressure exerts a compressive force at the outer end, therefore, basement wall cracks tend to develop on the inside of such walls.

One of the traditional methods of repairing the leaks and cracks and relieving the external pressure is to drill holes and provide for channeling of the water away on the inside. Yet another method for repairing cracks and leaks is to inject an epoxy resin into the cracks. Although these methods will prevent further water from entering the cracks they do not bind the concrete walls and prevent further cracking or bowing of the concrete walls.

Yet another means of correcting the cracks in the walls is to use fiberglass cloth with epoxy or polyester resin. Fiberglass has good tensile properties and can carry the load on the interior of the basement walls that is in tension. However, one of the major drawbacks with this method is that mixing the epoxy or polyester and wetting out the fabric is time consuming and messy.

The use of carbon fiber bonded plates for structural application has been an area of study for many years. The cost of the carbon fiber material has not allowed practical applications to keep up with academic evaluations. Carbon fiber plates have been studied as an external reinforcement by the Swiss Federal Testing Laboratories and is documented in a paper written in 1995. [Meier, U,; Winsitorfer, A. Retro-fitting of Structures through external Bonding of CFRP Sheets. Non-Metallic Reinforcement of Concrete Structures, Ghent, (1995), pages 465–472]. In this case it was "used to repair a defective structure, to allow for increases in applied load, or to allow modification for changes in use."

Another experiment was carried out in the use of carbon fiber strips to reinforce masonry structures to resist earthquakes. [STEINER, W. Strengthening of structures with CFRP strips. Advanced Composite Materials and Structures, Montreal, 1996, pp407–417.

The use of carbon fiber plates for reinforcement and repair of concrete structures is well documented and known by those skilled in the art. In recent years, this technology, which has been well documented in the literature, has, with lowered cost of carbon material, become economically feasible to apply this technology to concrete walls which are reinforced using precut strips of carbon fiber. This prevents the walls from cracking or collapsing. However, precut carbon fiber strips have to be cleaned and roughened, commonly done through sanding, to provide mechanical adhesion with the walls. The sanding process is not only time consuming, but is completely dependent on the skill of the operator sanding the surface of the strip. Sanding also may not remove oil or waxy materials and may spread such contaminants with a detrimental affect on bonding. This results in extra cost in transporting and storing the present strips.

The strips of carbon for these prior systems must also be narrow to insure that air pockets are not trapped under the carbon fiber strips. Inspection for air pockets is costly and difficult.

The strips being of high fiber density provides a very stiff strip which greatly differs in stiffness form the masonry that it is reinforcing this causes an "edge effect" stress between the reinforced and un-reinforced masonry. The stiffness variation at the edge of the strip has been shown to cause cracking at the junction for the reinforced to un-reinforced masonry due to shear at this large change in relative stiffness.

Also, the thickness of normal pultrusion or carbon plates provides a structure which is much too stiff for the bonding characteristics of the adhesive or the surface strength of the masonry structure. That is, the reinforcement is of no use if it pulls loose from the surface to which it is bonded. This loosening can be due to the reinforcement being too strong and pulling loose due to unequal thermal expansion, this condition is aggravated by the reinforcement being too stiff.

The carbon strips, which are very stiff, can come loose from the structure that is reinforcing. Generally the bonding material and the surface of the structure being reinforced is much weaker and has a significantly lower modulus of elasticity than that of the carbon fiber. This sudden loosening starts with a high stress causing a crack at an air void or other high stress area; this initial crack can propagate due to a high stress at the crack and lack of elongation in the carbon fiber material.

The use of a plate also blocks moisture flow through the masonry structure thus capturing moisture behind the plate. This moisture rich area tends to weaken the masonry and masonry to adhesive bond area. In areas of frost this moisture allows frost action to work on the bond with deleterious freezing and expansion of the moisture; this action can cause delamination.

With the limitations of the prior art in mind, it is an object of the present invention to provide an article for reinforcing a structure element to effectively resist bending or other lateral forces applied to the structure element.

Another object of the present invention is to provide an article that does not require any sanding to provide mechanical adhesion in order to attach the article to the structural element and one which will remain sufficiently clean at a job site.

It is yet another object of the present invention to provide an article that prevents air pockets from forming, that inhibits micro-crack propagation, and prevents thick glue areas from developing.

It is yet another object of the present invention to provide a method whereby an article for use in reinforcing is firmly adhered to the structural element, thereby reinforcing the structural member.

It is yet another object of the present invention to use existing materials to apply uniform pressure to firmly adhere the article to the structural element, thereby resulting in a strong reinforced structural member.

Another object of the present invention is to provide a product and method which is economical, efficient in operation, and capable of a long operating life.

It is another object of the present invention to provide a method for adhering a breathable strip and adhesive to allow moisture migration through the bonded reinforcement.

It is another object of the present invention to provide a method for applying a reinforcement structure that is wider than a strip to minimize the "edge effect" stresses at the boundary between the reinforced and un-reinforced structure.

It is also an object to provide reinforcement through spacing and choice of the fiber type to provide a better match between the reinforcement and the structure. This provides a strip which does not overpower the bonding material.

Another object is to taper the edges of the sheet to reduce stress concentrations along the edges of the strip.

Another object is to provide a reinforcement that, if it fails, will fail in a progressive manner thus providing a visual warning that failure is occurring.

Another object is to provide a method of applying reinforcements to the wall which hold the reinforcement in place until the bonding is completed for a neat, strong and workmanlike reinforcement.

Another object is to provide a method of manufacturing a grid where the lateral fibers are woven or wrapped to the longitudinal fibers thus trying the fibers together to allow the stiff longitudinal fibers to carry the load and the elastic lateral fibers to deform to spread the loading more evenly across the glue and supported structure.

SUMMARY OF THE PRESENT INVENTION

In accordance with the preferred embodiment of the present invention, an article (a reinforcing member) and method for reinforcing structural elements, such as concrete walls, support beams and the like, are provided.

The article in accordance with the present invention comprises a carbon fiber strip with an exposed roughened surface. In order to make the article, epoxy resin is applied to carbon fibers. The epoxy resin is allowed to permeate the thickness of the carbon fibers. Due to the uneven surface of the carbon fibers, a thin layer of epoxy forms on a top or exterior of the carbon fiber. A plastic cover sheet is then placed on top of the carbon fiber. Carbon fiber material with the epoxy and the plastic fiber is then subjected to high heat and pressure to cure the epoxy thereby forming the carbon fiber into a rigid sheet, with an adhered cover sheet, that can be cut into strips. At the job site, the cover sheet is readily removed and the resultant sheet of carbon fiber will have a roughened surface defined by the epoxy resin where it had adhered to the cover sheet. The cover sheet keeps out greases and oils that sanding may not remove.

In an alternate embodiment of the present invention, the article comprises a rigidified carbon fiber mesh tape. The mesh tape is comprised of a number of carbon fibers woven together to form a rigidified matrix. When bonded to a structural element, the bonding agent flows through the mesh, eliminating air pockets and thick glue areas. Moreover, propagation of micro-cracks formed between fibers is limited to the spaces between fibers and cannot propagate along the mesh tape.

The mesh tape when used with a breathable adhesive will not trap moisture behind the reinforcement.

The mesh tape since air entrapment is not an issue allows a wide sheet to be used. The wider sheet minimizes the structural changes between the reinforced and un-reinforced transition in the structure.

The edges of the mesh tape can have wider fiber spacing to feather the stiffness of the tape so not to cause a large stress concentration at the junction of the reinforced structure to the un-reinforced structure.

The method of adhering the article to a structural element comprises the steps of applying a second epoxy resin to the structural element; adhering the article to the second epoxy resin; allowing the second resin to cure while applying pressure to the article and structural element. Pressure may be applied through use of an overlying plastic sheet, the edges of which are sealed with the help of an adhesive to the structural element. A uniform pressure is applied with the help of an external vacuum pump and the vacuum is applied until the epoxy is cured and the article is firmly fixed to the structural element.

DETAILED DESCRIPTION OF THE PREFERRED EMBODIMENT

The following description of the preferred embodiment is merely exemplary in nature, and is in no way intended to limit the invention, or its application, or uses.

Figure 1:
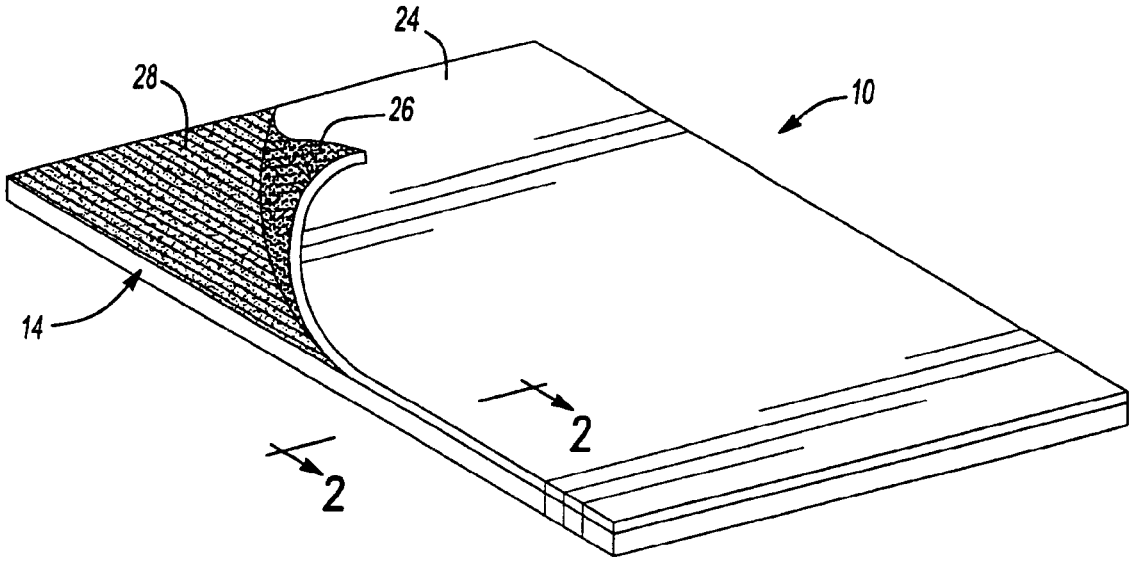
FIG. 1 is a perspective view of the reinforcing article in accordance with the teachings of the present invention.
Figure 3:
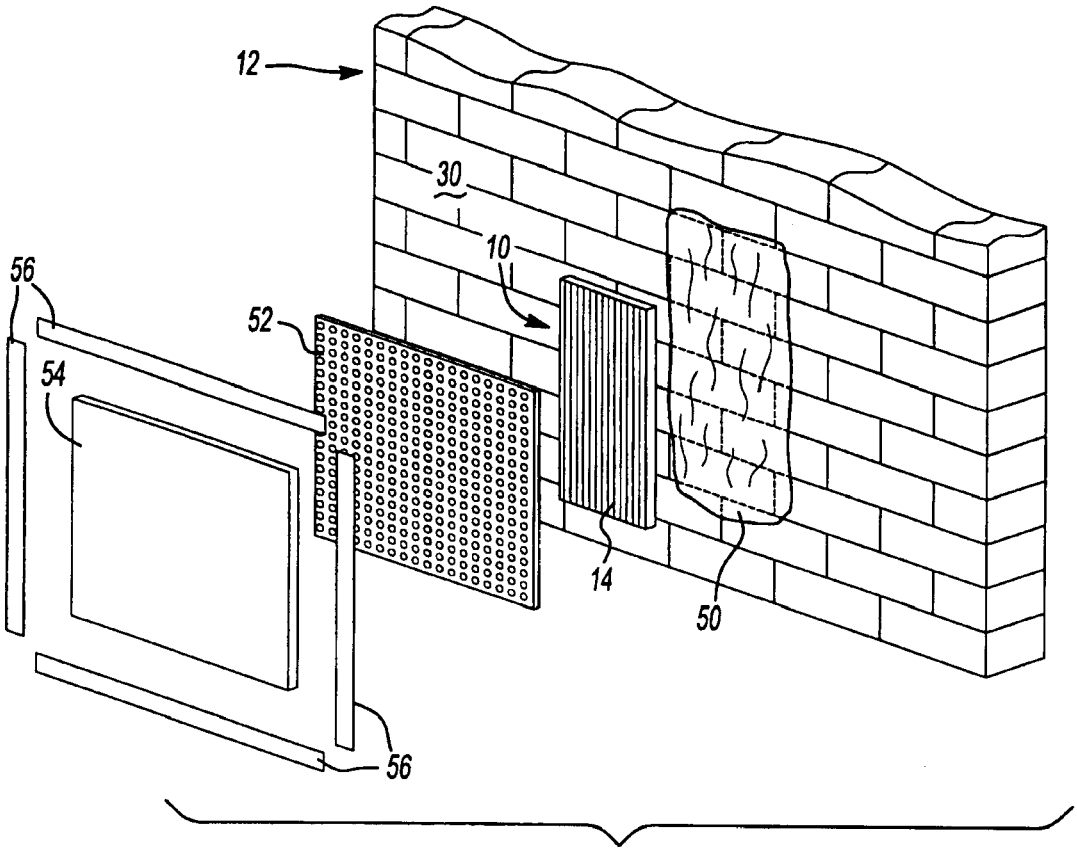
FIG. 3 is an exploded view of the various elements used to adhere the reinforcing article to a structural element in accordance with the teachings of the present invention.

Referring now to the drawings, shown in FIG. 1 is an article, a carbon fiber strip assembly 10 (here after just strip 10) for use in reinforcing structure element 12, such as a concrete block wall, as seen in FIG. 3. In accordance with the teachings of the present invention, the strip 10 comprises a carbon fiber sheet 14 having a roughened surface 28 exposed or produced upon removal of a cover sheet 24.

To obtain the strip 10, a layer of carbon fiber 13 having a first surface 16 and a second surface 18, is provided. The first surface 16 and the second surface 18 of the carbon fiber 13 define a thickness 20. The fibers (not shown specifically in the drawings) of the carbon fiber 13 are generally axially oriented with respect to the strip 10 for good tensile strength as is well known.

Figure 2:
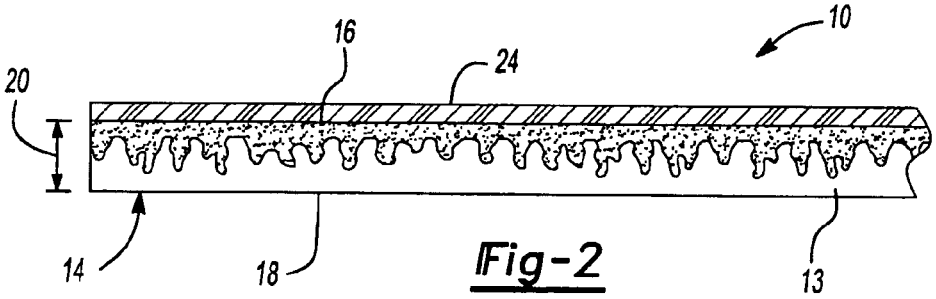
FIG. 2 is a sectional view taken substantially along line 2-2 in FIG. 1 of the present invention.

Referring in particular to FIGS. 1 and 2, a first epoxy resin 22 is applied to either the first surface 16 or the second surface 18 of the carbon fiber 13. In the preferred embodiment as illustrated in the drawings, the epoxy resin 22 is applied to the first surface 16 of the carbon fiber 13. Since the fibers in the carbon fiber 13 defines gaps or voids between them, the epoxy resin 22 permeates the entire thickness 20 of the carbon fiber 13 and a thin layer or at least some of the epoxy resin 22 remains on the surface 16 of the carbon fiber 13. In the preferred embodiment, the epoxy resin has low viscosity such that when applied to the carbon fiber material it permeates the fibers.

Figure 6:
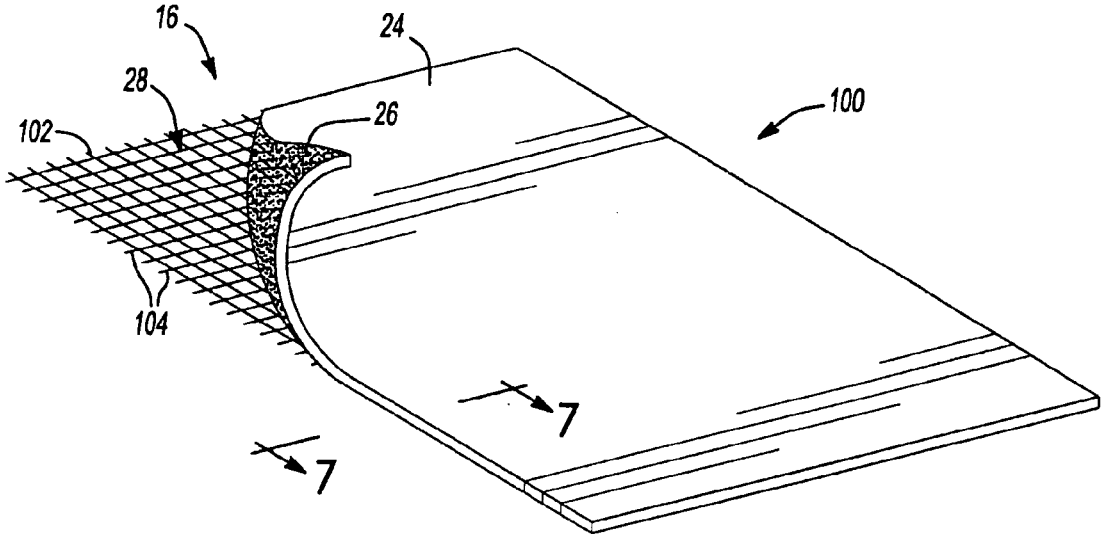
FIG. 6 is a perspective view of a rigidified fiber mesh tape reinforcing article in accordance with the present invention.
Figure 7:
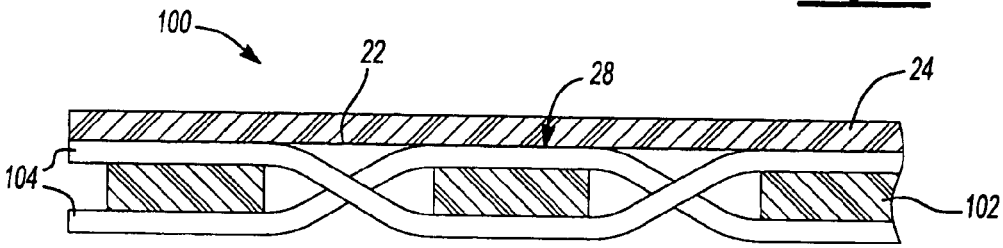
FIG. 7 is a sectional view taken substantially along line 7-7 in FIG. 6 of the rigidified fiber mesh tape according to the alternate embodiment of the present invention.
Figure 8:
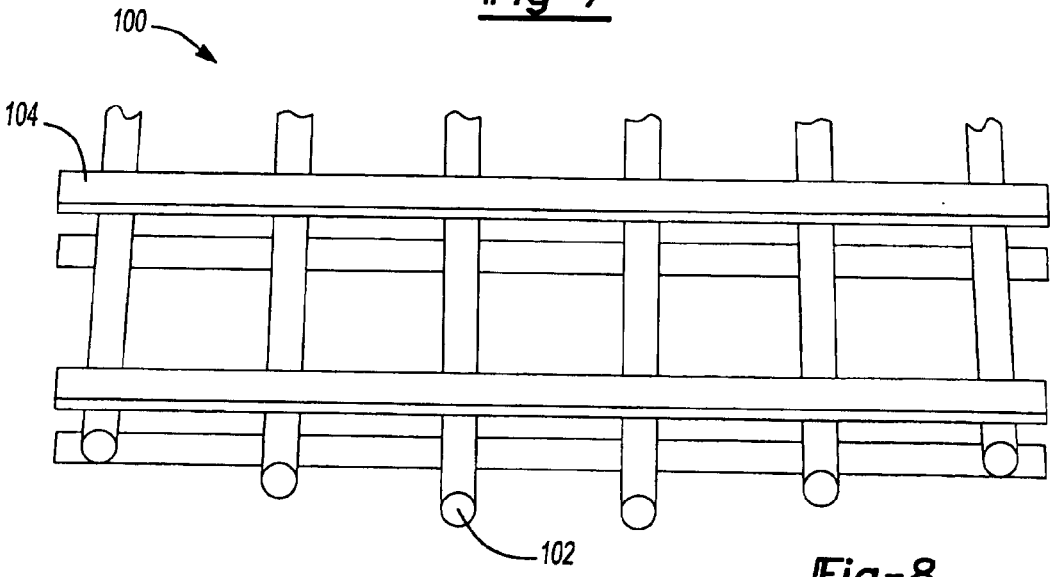
FIG. 8 is a perspective view of an alternative weave pattern of the rigidified fiber mesh tape according to the present invention.

An alternate embodiment of the invention, shown in FIGS. 6–9, is a rigidified fiber mesh tape 100, for use in reinforcing structure element 12. The rigidified fiber mesh tape 100 comprises a number of longitudinal fibers 102 and a number of lateral or transverse fibers 104. The longitudinal fibers 102 run parallel to one another and are in tension. As best seen in FIG. 7, the lateral fibers 104 are woven into the longitudinal fibers 102, the lateral fibers 104 alternating from a position above the longitudinal fibers 102 to a position below the longitudinal fibers 102. Alternatively, as best seen in FIG. 8, the lateral fibers 104 sandwich the longitudinal fibers 102.

In other words, the carbon fibers are layered on top and below the longitudinal fibers 102, providing a fiber mesh tape 100 with straight longitudinal fibers. The straight fibers are thus ideally oriented to carry tension loading. The lateral fibers may ideally be made of another fiber that is very elastic and can be woven into the stiffer longitudinal fibers. A Kevlar® type lateral fiber is ideal since it has very high elongation this elongation spreads the loading more evenly across the glue and the reinforced structure. Also a partial or local failure will not propagate, as with a plate, since the longitudinal fibers will stretch and reallocate the load by allowing adjacent longitudinal fibers to share the loading. This prevents a rapid crack propagation found in solid plates with a catastrophic or sudden failure. The longitudinal fiber should be kept straight since a woven fiber will tend to straighten when loaded which will put stress on the bonding agent and will tend to not be as stiff. A reduction of manufacturing cost and a reduction in lateral stiffness may be achieved by having lateral fibers only on one side. Note the lateral fibers can be woven to the longitudinal fibers using a fiber wrapping pattern to provide better attachment between the lateral and longitudinal fibers. Also this fiber can be chosen for adhesion with the chosen agent for bonding the structure.

Figure 9:
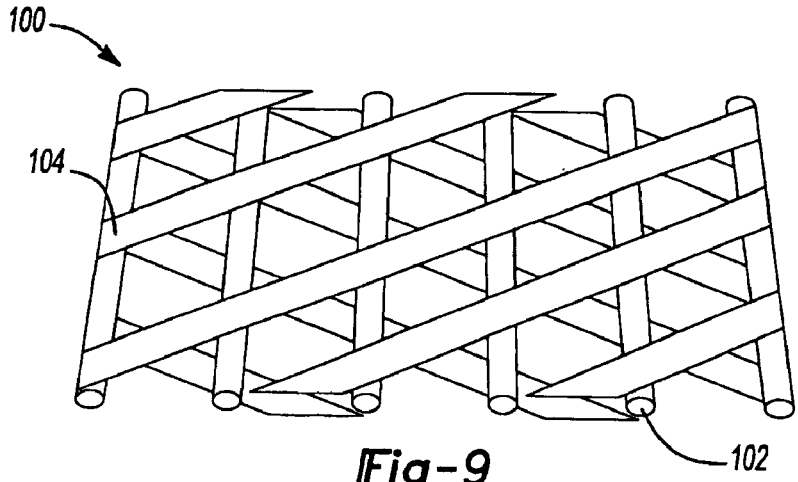
FIG. 9 is a perspective view of an alternate weave pattern of the rigidified fiber mesh tape reinforcing article in accordance with the present invention.

The longitudinal fibers 102 and lateral fibers 104 may be of any cross-sectional shape, such as flat (ribbon like), rectangular, oval or round. In the preferred embodiment, the lateral fibers 104 have a flat cross-section, as seen in FIGS. 7–9, providing a large surface area to contact the structural element 12 and providing a low bending stiffness in the plane of the reinforcement strip. Alternatively, an elliptical cross-section (not particularly shown) may be used for the longitudinal fibers 102 or lateral fibers 104 to provide similar benefits.

As shown in FIGS. 6–8, the lateral fibers 104 are generally at 90-degree angles (transverse) to the longitudinal fibers 102. In an alternate embodiment, as shown in FIG. 9, the lateral fibers 104 may be at 45-degree angles to the longitudinal fibers 102, or some angle between 45-degrees and 90-degrees. In a 45-degree fiber orientation, the lateral fibers 104 tend to be loaded in tension along with the longitudinal fibers 102.

Generally speaking, the longitudinal fibers 102 and lateral fibers 104 may be spaced anywhere from over 1 inch apart to less than 1/32 inches apart so long as the spacing is sufficient to allow adhesive to flow between the fibers 102, 104, as will be discussed in detail herein. The longitudinal fibers 102 can vary in spacing to provide a tapered (or feathered) stiffness at the edge of the strip; this tapered stiffness provides a gradual change in stress between the reinforced and un-reinforced structure thus minimizing stress concentrations in the reinforced structure at the edge of the reinforcement strip. Alternatively, longitudinal fibers having tapered thicknesses along the edge of the strip or a different modulus can be used to feather the stiffness of the strip at the edges in order to minimize or reduce the stress concentrations at the edge of the reinforcement strip. The rigidified fiber mesh tape 100 has a roughened surface 28 exposed or produced upon removal of a cover sheet 24, as will be discussed in detail herein. In the preferred embodiment, the fibers 102, 104 are made of pre-cured carbon rods. The pre-cured carbon rods are positioned in a planar configuration and woven together with fibers 104. Alternatively, a fiber filament can be wound around the fiber strands 102, 104 to keep the tows from spreading out and closing the windows. In a preferred embodiment, filaments are wound helically along a length of the longitudinal fibers. Moreover, longitudinal fibers 102 and lateral fibers 104 may be of different materials to provide desired properties of rigidified mesh tape 100. For example, either fibers 102 or 104 may be formed from a fibrous material having high axial bending to allow conformance to non-planar surfaces such as columns, tubes, or other curved surfaces. Additionally, the fibers 102, 104 may be constructed of a material having desirable chemical or mechanical properties to optimize adhesion to the structural element 12.

In the alternate embodiment as shown in FIG. 6, the epoxy resin 22 (discussed above) is applied to the first surface 16 of the rigidified fiber mesh tape 100 and a thin layer or at least some of the epoxy resin 22 remains on the surface 16 of the rigidified fiber mesh tape 100. It should be noted that the openings between the longitudinal fibers 102 and lateral fibers 104 remain unobstructed. Use of a tear sheet 26 rips away any epoxy film that may tend to close the windows thus assuring not only a clean surface, but also open windows. The grid pattern of the fiber mesh tape 100 provides a high bonding surface area and provides a peel stop (rip stop) type function that a continuous surface does not.

As mentioned above, to provide a strong bond between the reinforcing strip 10 or rigified fiber mesh tape 100 and the reinforced structural element 12, it is important to have the surface of the strip 10 or rigified fiber mesh tape 100 clean and roughed. In order to keep the surface clean and provide a roughened surface, over the layer of epoxy resin 22, on the surface 16 (and optionally on the surface 18), is applied a flexible cover sheet 24 of impermeable textile, nylon, or plastic material. The side of the cover sheet 24 in contact with the epoxy resin 22 preferably exhibits a texture, such as a woven texture surface. The carbon fiber 13 or rigidified fiber mesh tape 100, with the epoxy resin 22 and the cover sheet 24 applied, are subject to high temperature and pressure, via known techniques, allowing the epoxy resin 22 to cure. Once the epoxy resin 22 has cured, the result is a rigid carbon fiber sheet 14 or rigidified fiber mesh tape 100 having a removable cover sheet 24 covering one or both surfaces thereof. This rigid carbon fiber sheet 14 or rigidified fiber mesh tape 100 may then be cut or sawn into the desired sizes forming the strip 10. In this form, the strip 10 or rigidified fiber mesh tape 100 can be stored and/or shipped to a job site for use. With the rigidified fiber mesh tape 100, the resin applied during the manufacture of the open fabric tends to fill the window between the mesh. When the textured cover sheet is removed, these windows remain adhered to the cover sheet and leave the openings clear. Thus, the cover sheet provides both a roughened surface, but also open windows.

At the job site during shipping and handling, the cover sheet 24 prevents dirt, hand oil, grease, and other debris, oils, and chemical from coming into contact with the carbon fiber sheet 14 or rigidified fiber mesh tape 100. The cover sheet 24 also protects the bonding surface from mechanical abrasion or polishing. Immediately prior to use, the cover sheet 24 is removed, or more accurately peeled away, from the surface 16 of the carbon fiber sheet 14 or rigidified fiber mesh tape 100 leaving exposed a clean roughened surface 28. This process saves time in the field as compared to prior methods which require solvent cleaning and abrasion steps. This roughened surface 28 is a result of at least two factors, individually or in combination. First, the roughened surface 26 of the cover sheet 24 causes an impression to be formed in the epoxy resin 22 on the surface 16 as it cures. Second, as the cover sheet 24 is removed from the carbon fiber sheet 14, some of the epoxy resin 22 remains adhered to the plastic sheet 24 and breaks away from the carbon fiber sheet 14 or rigidified fiber mesh tape 100.

As illustrated in the drawings, the strips 10 or rigidified fiber mesh tape 100 are pre-cut and provided in suitable lengths for their intended use. However, it is possible to use large sheets and/or cut them to the required sizes before adhering them to reinforce a structural element 12.

Figure 4:
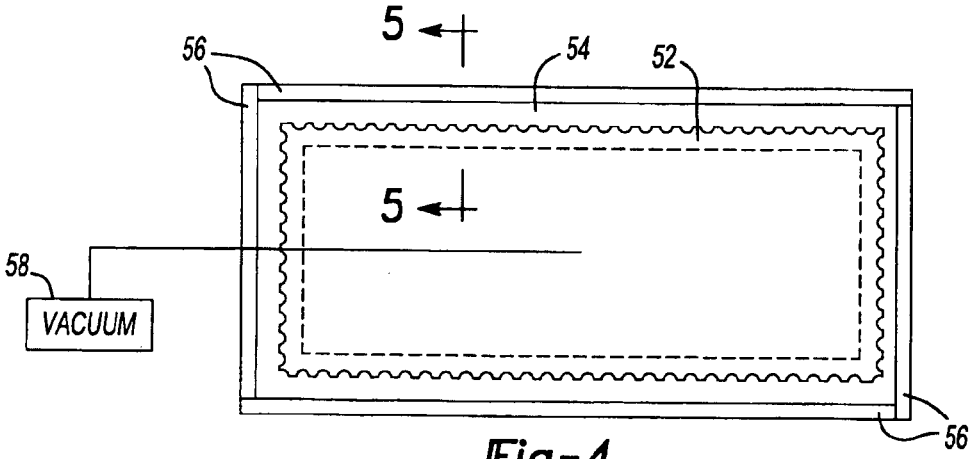
FIG. 4 is a top view of the reinforcing article being attached to a structural element in accordance with the teachings of the present invention.
Figure 5:
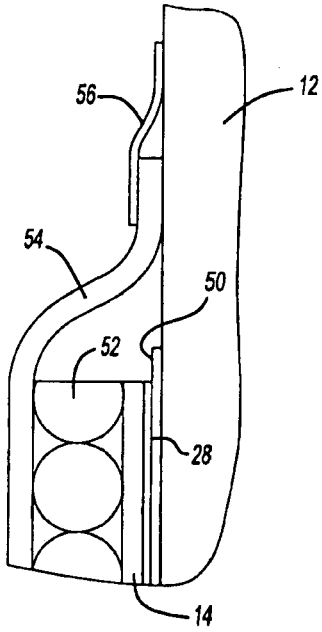
FIG. 5 is a sectional view taken along the line 5-5 in FIG. 4 of the present invention.

As shown in FIGS. 3–5, the strips 10 or rigidified fiber mesh tape 100 are intended to be attached to a structural element 12, such as a concrete block wall, the face 30 of which is being loading in tension.

In order to attach the strip 10 or rigidified fiber mesh tape 100 to the structural element 12 to reinforce the same, a second epoxy resin 50 is applied to the structural element 12. The second epoxy resin 50 may be of the same kind or different kind from the first epoxy resin 22 such as a water permeable adhesive to allow the structure to breathe. An example of a water permeable adhesive is a urethane-type adhesive. The carbon fiber sheet 14 or rigidified fiber mesh tape 100, with the plastic sheet 24 removed and the roughened surface 28 exposed, is placed against the front face 30 of the structural member 12 where the second epoxy resin 50 has been applied, such that the roughened surface 28 is contacting the second epoxy resin 50.

In order to ensure that the carbon fiber sheet 14 or rigidified fiber mesh tape 100 firmly adheres to the structural element 12, sheet 14 or fiber mesh tape 100 should be held in place until the epoxy resin 50 cures. This is achieved in the method of the present invention by covering the sheet 14 or rigidified fiber mesh tape 100 with a sheet of air impermeable material 54, such as a plastic sheet, and by positioning between the impermeable material 54 and the carbon fiber sheet 14 or rigidified fiber mesh tape 100 a material 52 which will allow for uniform evacuation of air from between the impermeable material 54 and the structural element 12. In the preferred embodiment, the material 52 is a commercially available bubble wrap, such as that extensively used in the packaging industry. Alternatively, a permeable textile, fabric or other material which will facilitate even evacuation over the sheet 14 or rigified fiber mesh tape 100, may also be used. In the preferred embodiment, any commercially available plastic sheet may be used as the impermeable material 54. The edges of the impermeable material 54 are then sealed to the structural element 12 through adhesives or adhesive strips 56.

With the impermeable material 54 so mounted to the structural element 12 over the carbon fiber sheet 14 or rigidified fiber mesh tape 100, air is evacuated through use of a vacuum pump 58 coupled via a vacuum line and fitted to the impermeable material 54. Due to the presence of the material 52, when a vacuum is applied, a uniform pressure is applied over the entire sheet 14 or rigidified fiber mesh tape 100. The vacuum is applied until the second epoxy resin 50 cures and the sheet 14 or rigidified fiber mesh tape 100 firmly adheres to the structural element 12. Under this method, the normal curing time with common epoxies is expected to be about 3–4 hours, after which impermeable material 54 and material 52 are removed. The carbon fiber sheet 14 or rigidified fiber mesh tape 100 will thereafter be firmly attached to the structural element 12 providing the desired reinforcement thereto.

In the rigidified fiber mesh tape embodiment of the invention, the second epoxy resin 50 will flow through the spaces between the longitudinal fibers 102 and the lateral fibers 104 such that no thick glue areas are formed. Moreover, as pressure is applied, air will flow through the mesh holes between the fibers 102, 104 preventing air pocket formation. When a plate is utilized according to other methods and is glued to the structural element, the plate and glue can trap air between the carbon fiber plate and the structural element. Air voids are stress risers and a source of micro-cracks. These micro-cracks, once started, may follow the plate surface and can lead to delamination of the plate. Similarly, thick glue areas may form between the carbon fiber plate and the structural element. Since the glue itself fails at a lower force than does the carbon fiber plate or the structural element, these thick glue areas create weak points in the reinforcement.

An alternate method of applying the strip 10 or fiber mesh tape 100 of the structural element 12 is provided wherein the cover sheet 24 is removed from the strip to expose the roughened surface 28 on a side of the strip 10. A generous layer of epoxy resin 50 is applied along either the structural element 12 or the strip 10, or both. The strip 10 is placed against the front face 30 of the structural element 12 while spreading epoxy resin 50 around the periphery of the strip 10 and onto the structural element 12.

To ensure that the strip 10 or tape 100 firmly adheres to the structural element 12, the strip 10 is desirably held in place until the epoxy resin 50 is fully cured. This is accomplished by placing an impermeable material 54, such as a plastic sheet over the strip 10 and a portion of the front face 30 of the structural element 12. The impermeable material 54 is held in place over the strip 10 by the epoxy resin 50 around the periphery of the strip 10 due to the mechanical adhesion of the epoxy resin 50.

Once the impermeable material 54 is positioned generally over the strip 10, the epoxy resin 50 is manually dispersed to provide proper distribution and bonding to the structural element 12. In a preferred method, a deformable member such as a squeegee is manually traced over the surface of the impermeable material to disperse the epoxy resin 50 between the strip 10 and the structural element 12. As the epoxy resin 50 is dispersed, epoxy resin 50 is spread past the periphery of the strip and contacts the structural element 12 and the impermeable material 54. The mechanical adhesion of the epoxy resin 50 couples the impermeable material 54 to the structural element 12 while the epoxy resin 50 is curing. Also, the mechanical adhesion of the epoxy resin 50 holds the strip 10 to the structural element 12 during curing. By this method, no additional support is needed to hold the impermeable material 54 in place while the epoxy resin 50 is curing.

Figure 12:
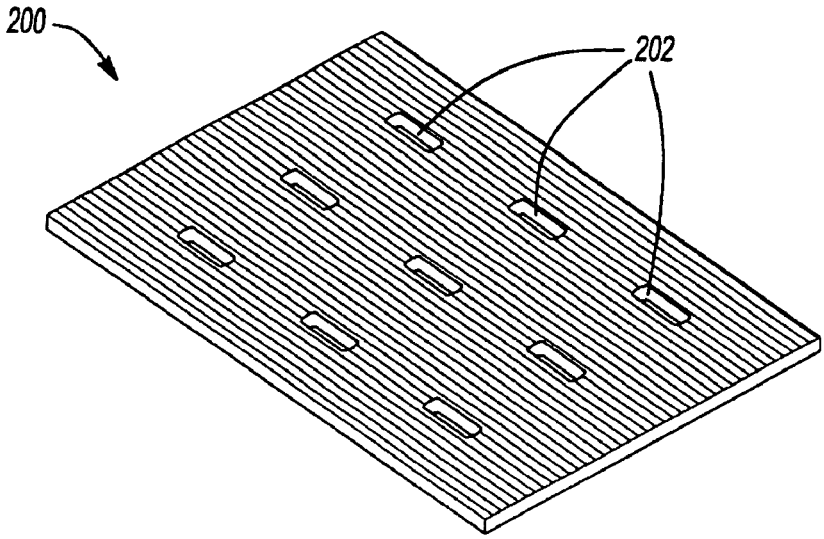
FIG. 12 is a perspective view of a third embodiment of a tensile tape reinforcing article in accordance with the present invention.
Figure 13:
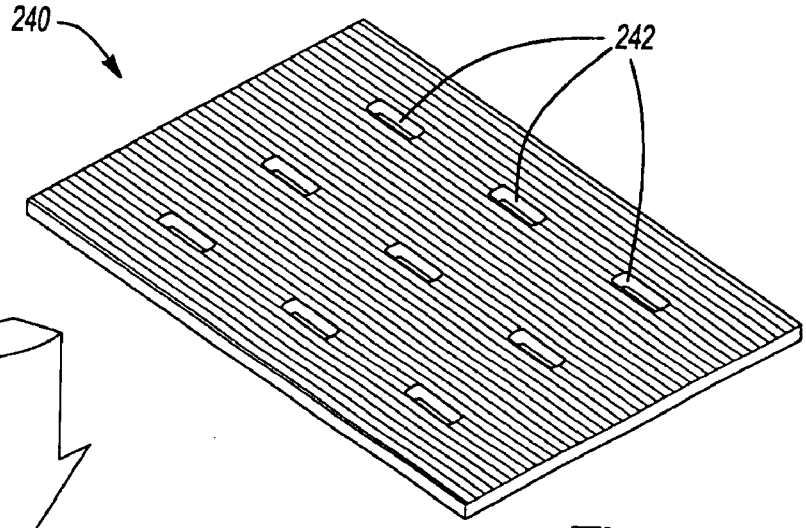
FIG. 13 is a perspective view of a fourth embodiment of a tensile tape reinforcing article in accordance with the present invention.
Figure 14:
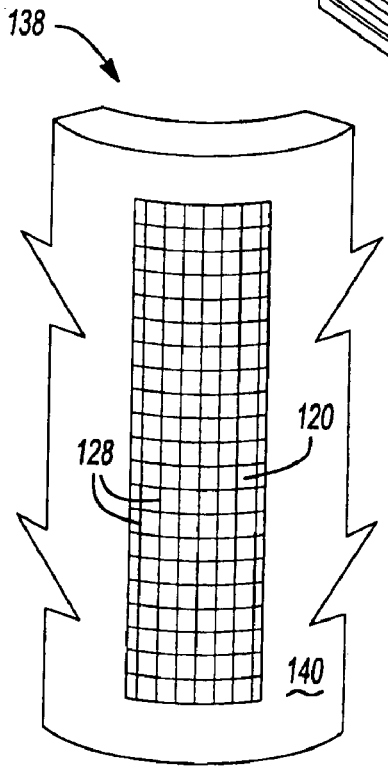
FIG. 14 is a perspective view of the tensile tape reinforcing article being attached to a structural element in accordance with the teachings of the present invention.
Figure 15:
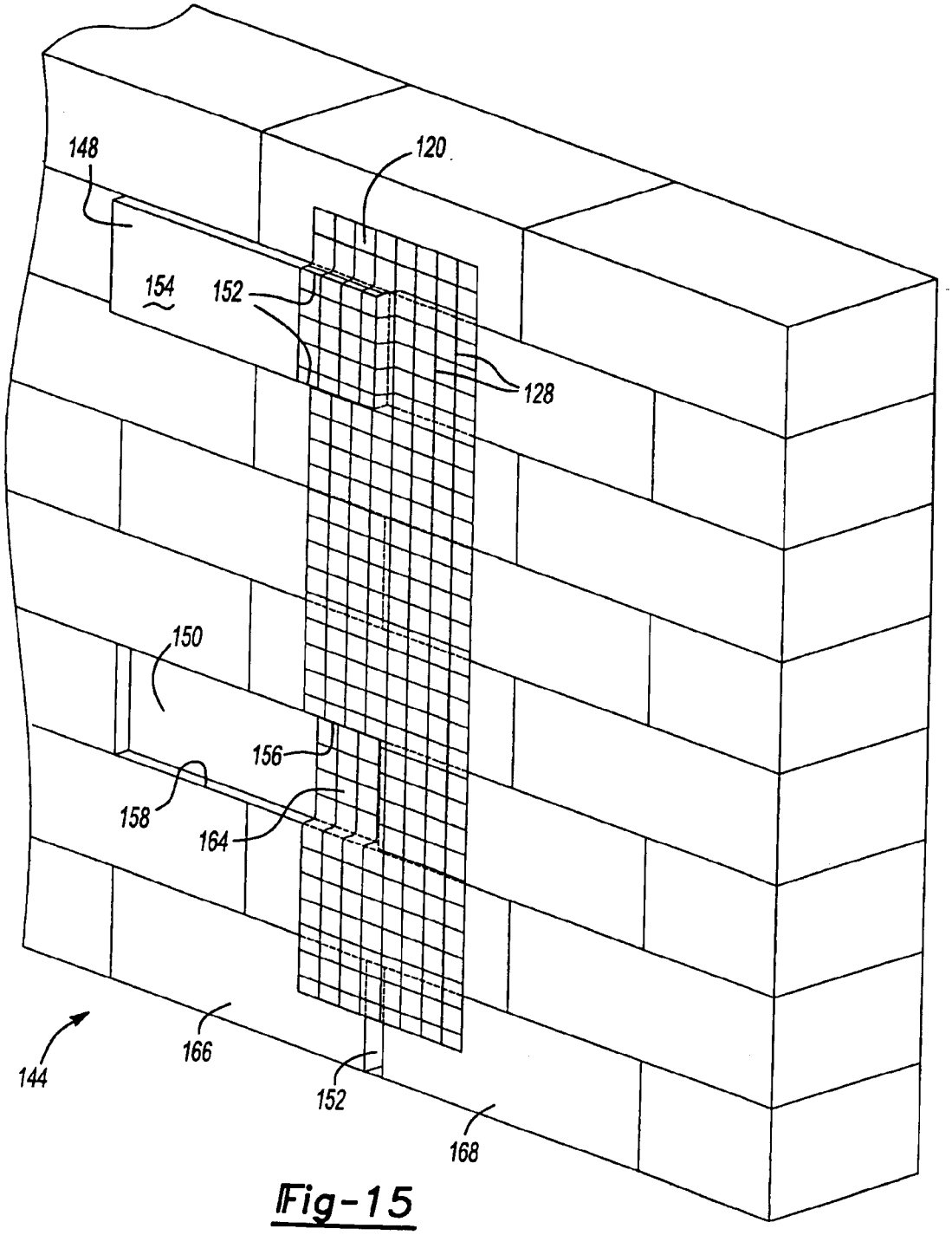
FIG. 15 is a perspective view of the tensile tape reinforcing article being attached to a structural element in accordance with the teachings of the present invention.

Another alternate embodiment of the invention, shown in FIGS. 10–13, is a carbon tensile tape for use in reinforcing structure element 12, such as a concrete block wall, as seen in FIGS. 14 and 15. In accordance with the teachings of the present invention, the tensile tape 120 comprises a carbon fiber sheet 122 having a roughened surface 124 exposed or produced upon removal of a cover sheet 126. The cover sheet 126 keeps the bonding area clean from dirt, hand oil, and other oils and debris during shipment and handling. The cover sheet 126 causes fracture and roughness of the coating material to assure consistent bonding. The cover sheet 126 protects the bonding surface form mechanical abrasion or polishing and saves time in the field for preparing a clean roughened surface on the tensile tape 120.

Figure 10:
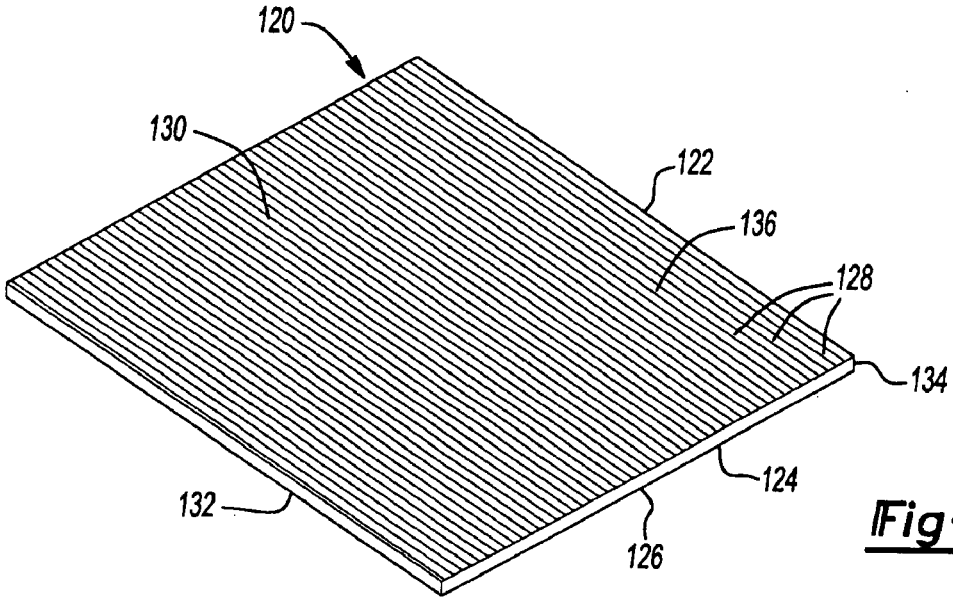
FIG. 10 is a perspective view of a first embodiment of a tensile tape reinforcing article in accordance with the present invention.

FIG. 10 illustrates a tensile tape 120 constructed in accordance with the present invention. To obtain the tensile tape 120, a layer of carbon fibers 128 having a first surface 130 and a second surface 132, is formed. The carbon fibers 128 have a relatively high tensile strength, and are relatively bendable in the axial direction. The carbon fibers 128 are oriented to form a first surface 130 and a second surface 132 that define a thickness 134 of the tensile tape 120. Thickness of the tape or mesh may be in the order of 0.002 inches to 0.050 inches. The thickness 134 of the tensile tape 120 is formed to allow relatively easy bending of the tensile tape 120 to conform to various irregularities as shown in FIGS. 14 and 15. The flexibility of the tensile tape allows wider strips to be used (currently, about two-inch widths are the maximum that can be used with assurance that voids are not present). The fibers (not shown specifically in the drawings) are generally axially oriented with respect to the tensile tape 120 for good tensile strength as is well known.

With continued reference to the structure of tensile tape 120, a first epoxy resin 136 is applied to either the first surface 130 or the second surface 132 of the tensile tape 120. In the preferred embodiment as illustrated in the drawings, the epoxy resin is applied to the first surface 130. Since the carbon fibers 128 when stacked into the desired shape of the tensile tape 120 inherently includes gaps or voids between them, the epoxy resin permeates the entire thickness 134 of the carbon fiber 128 and a thin layer or at least some of the epoxy resin 136 remains on the surface of the carbon fiber 128. In the preferred embodiment, the epoxy resin 136 has low viscosity such that when applied to the tensile tape 120 it permeates the carbon fibers 128. The first epoxy resin 136 is applied to either surface 130 or second surface 132 of the tensile tape 120. In the preferred embodiment as illustrated in the drawings, the epoxy resin is applied to the first surface 130. Since the carbon fibers 128 when stacked in the desired shape of the tensile tape 120 inherently includes areas between the fibers that are resin rich. This resin rich window will stick to the peel ply and be torn out of the tape when the peel ply is removed leaving an open window. The portion of the resin that permeates the longitudinal and lateral fibers remains after the peel ply is torn off. The epoxy resin 136 has a low viscosity such that when applied to the carbon and/or other fiber material the glue fully permeates the fibers.

The axial flexibility of the carbon fibers 128 and the relatively small thickness 134 of the tensile tape 120 allow conformance to surfaces having various shapes or contours. As shown in FIG. 14, structural elements such as brick or cement may be formed to have external surfaces that are different that the common planar surface found on most structural elements. Also, the fibers running in the lateral direction can be of a lower stiffness due to shape and size and made of lower modulus material with higher elongation material such as Kevlar thus allowing the tape to easily bend laterally. The structural element 138 shown in FIG. 14 is a convex surface 140 of a brick foundation wall. The convex surface, like the planar surface is subject to external forces that may cause damage to the structure element. Particularly, external forces that increase the tension load on the structure element may cause cracking of the brick or the mortar joints and cause bowing of the structure load.

The carbon tensile tape 120 is shown in FIG. 14 in conjunction with the convex surface 140 of structural element 138. The tensile tape 120 is positioned to allow the width of the tensile tape 120 to extend along the convex surface 140. The tape acts as a membrane with relatively low plate bending stiffness that allows the tensile tape 120 to conform to the convex surface 140 while retaining the axial orientation of the carbon fibers 128 to increase the tensile strength of the structural element 138. The tensile tape 120 is applied to the convex surface 140 using the method described above.

We claim:

1. A method for reinforcing a structural element comprising the steps of:

providing a flexible reinforcing member having a removable sheet material adhered to one side;

peeling off said removable sheet material from said flexible reinforcing member thereby exposing a roughened surface on said flexible reinforcing member;

applying a bonding agent to one of a surface of said structural element and said flexible reinforcing member;

placing said flexible reinforcing member on said structural element; and conforming said flexible reinforcing member to resemble a surface of said structural element.

2. The method of claim 1, wherein the structural element is cleaned and roughened prior to placing said flexible reinforcing member on the structural element.

3. The method of claim 1, wherein said bonding agent is an epoxy resin.

4. The method of claim 1, wherein pressure is applied to said flexible reinforcing member such that said bonding agent and said flexible reinforcing member conform to the structural element eliminating air pockets and thick areas of said bonding agent.

5. The method of claim 2, wherein said flexible reinforcing member is embedded within said bonding agent.

6. The method of claim 4, further comprising the step of applying pressure to said flexible reinforcing member thereby forcing said flexible reinforcing member towards the structural element until said bonding agent retains said flexible reinforcing member to the structural element.

7. The method of claim 5, wherein an air impermeable strip is placed over said flexible reinforcing member and is sealed to the structural element prior to application of pressure.

8. The method of claim 6, wherein a vacuum pump is used to apply a vacuum pressure to said air impermeable strip.

9. The method of claim 6, wherein a deformable member is traced along the air impermeable strip to apply said pressure.

10. The method of claim 1, including the step of verifying the dispersion of the bonding agent by visually inspecting sections of said reinforcing members.

11. The method of claim 1, wherein said flexible reinforcing member is a fiber mesh tape.

12. The method of claim 1, wherein said flexible reinforcing member is a tensile tape.

13. The method of claim 1, wherein said bonding agent is a breathable adhesive.

14. The method of claim 1, wherein said flexible reinforcing member includes a plurality of longitudinal fibers extending along a width of the flexible reinforcing member, wherein longitudinal fibers near an edge of said flexible reinforcing member have a different modulus than longitudinal fibers in a center portion of said flexible reinforcing member.

15. The method of claim 1, wherein said flexible reinforcing member includes a plurality of longitudinal fibers disposed along a width of said flexible reinforcing member, wherein said longitudinal fibers have tapered thicknesses near edges of the flexible reinforcing member to provide a feathered stiffness at the edge of said flexible reinforcing member.

16. The method of claim 1, wherein said flexible reinforcing member includes a plurality of longitudinal fibers disposed along a width of said flexible reinforcing member, wherein said longitudinal fibers are spaced further apart from one another near edges of said flexible reinforcing member than in a center portion of said flexible reinforcing member.

[17. A method for reinforcing a structural element comprising the steps of:

providing a flexible reinforcing tensile tape;

applying a bonding agent to one of a surface of the structural element and said flexible reinforcing tensile tape;

placing said flexible reinforcing tensile tape on said structural element; and conforming said flexible reinforcing tensile tape to resemble a surface of the structural element.]

[18. The method of claim 17, wherein the structural element is cleaned and roughened prior to placing said flexible reinforcing tensile tape on the structural element.]

[19. The method of claim 18, wherein said bonding agent is a breathable adhesive.]

[20. The method of claim 17, wherein pressure is applied to said flexible reinforcing tensile tape such that said bonding agent and said flexible reinforcing tensile tape conform to the structural element eliminating air pockets and thick areas of said bonding agent.]

[21. The method of claim 17 including the step of verifying the dispersion of the bonding agent by looking at inspection sections in said reinforcing members.]

*22. The method of claim 1, wherein said structural element is a concrete structure.*

* * * * *

UNITED STATES PATENT AND TRADEMARK OFFICE

CERTIFICATE OF CORRECTION

PATENT NO. : RE 39,839 E
APPLICATION NO. : 11/085795
DATED : March 21, 2005
INVENTOR(S) : Wheatley et al.

It is certified that error appears in the above-identified patent and that said Letters Patent is hereby corrected as shown below:

Column 1, line 60, “overflying” should be --overlying--.

Column 3, line 66, “trying” should be --tying--.

Column 7, line 33, “rigified” should be --rigidified--.

Column 11, after line 8 and before line 9, insert five paragraphs of missing text:

--Another structural element 144 having an irregular surface is shown in FIG. 15. The structural element 144 is formed of a plurality of layered blocks or bricks supported by mortar. The structural element 144 also include various irregularities such as a protruding block 148, a recessed block 150, and a gap 152 between blocks. The tensile tape 120 having a relatively low bending stiffness conforms to each of these irregularities while increasing the tensional strength of the structural element 144 as shown in FIG. 15. In the case of a protruding block 148, the carbon fibers 128 of the tensile tape are bent around the edges 152 of the protruding block 148 and positioned adjacent to the outer surface 154 of the protruded block 148. In the case of a recessed block 150, the carbon fibers 128 of the tensile tape 120 are bent around the edges 156, 158 of the adjacent blocks 160, 162 and positioned adjacent to the outer surface 164 of the recessed block 150. In the case of the gap 152 between blocks, the tensile tape 120 spans the gap 152 and adheres to the blocks 166, 168 adjacent to the gap and provide increased tensional strength.

Figure 11:
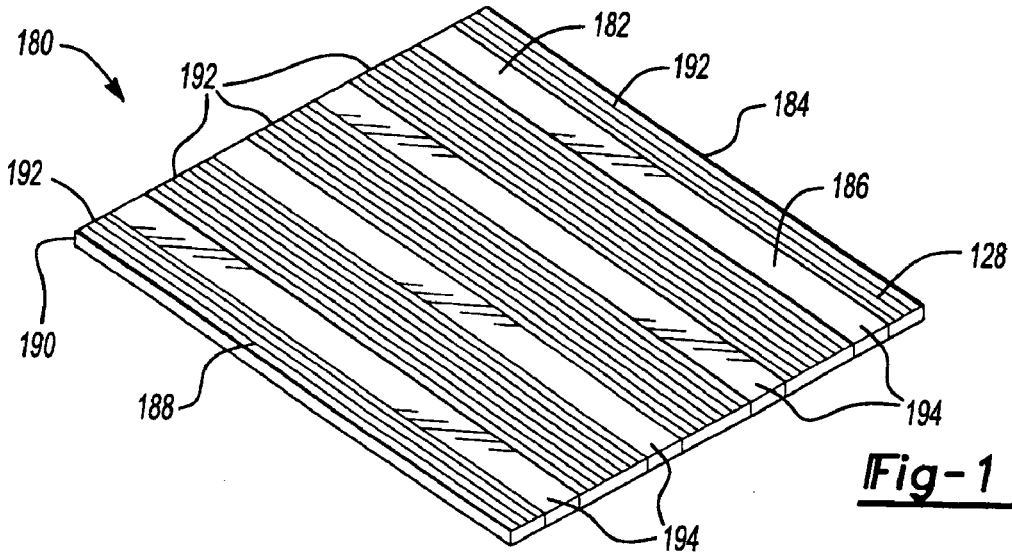
FIG. 11 is a perspective view of a second embodiment of a tensile tape reinforcing article in accordance with the present invention.

Another embodiment of a tensile tape 180 according to the present invention is shown in FIG. 11. The tensile tape 180 is substantially similar to the tensile tape 120, described above. As such, only the portions of the tensile tape 180 that are different will be discussed in detail. The tensile tape 180 is comprised of alternating sections of carbon fibers 128 and translucent fiberglass fibers 182 formed into a strip 184 having a first side 186 and a second side 188 defining a thickness 190. The carbon fiber sections 192 and fiberglass sections 194 are formed in a zebra like pattern. The translucent fiberglass fibers 182 allow visual inspection of the tensile tape 180 during adhesion to a surface of the structural element. In particular the translucent fiberglass sections 194 allow the installer of the tensile tape to visually ensure the epoxy between the tensile tape 180 and the structural element is properly positioned. Air pockets or improper distribution of the epoxy may reduce the effectiveness of the bond between the tensile tape and the structural element.

A third embodiment of the tensile tape 200 according to the present invention is shown in FIG. 12. The tensile tape 200 is substantially similar to the tensile tape 120, described above. As such, only the portions of the tensile tape 200 that are different will be discussed in detail. The tensile tape 200 includes a plurality of apertures 202 formed to allow visual inspection of the tensile tape 200 during installation. The apertures also allow any air entrapped beneath the tape to escape which allows use of a wider strip. This minimizes the potential and the size of any air bubbles between the tape and the reinforced structure. In particular the apertures 202 allow the installer of the tensile tape 200 to visually ensure the epoxy between the tensile tape and the structural element is properly positioned. The apertures 202 also provide additional mechanical adhesion of the tensile tape 200 to the structural element. The apertures 202 of the tensile tape are formed by using an insert in a molding operation or other suitable means 128 while the carbon fibers 128 are being formed to the shape of the tensile tape 200. The inserts of the molding operation ensure that the carbon fibers 128 of the tensile tape 200 remain continuous, thus increasing the tensile strength of the tensile tape 200.

A fourth embodiment of the tensile tape 240 according to the present invention is shown in FIG. 13. The tensile tape 240 is substantially similar to the tensile tape 120, described above. As such, only the portions of the tensile tape 240 that are different will be discussed in detail. The tensile tape 240 includes a plurality of apertures 242 formed therein for allowing visual inspection during installation. The apertures 242 allow the installer of the tensile tape 240 to visually ensure the epoxy between the tensile tape 240 and the structural element is properly positioned. The apertures 242 are formed after the carbon fibers 128 of the tensile tape 240 are formed into the desired shape. The apertures 242 are formed by a simple material removal process such as a punch or a machining process.

While the above description constitutes the preferred embodiment of the present invention, it will be appreciated that the invention is susceptible to modification, variation and change without departing from the proper scope and fair meaning of the accompanying claims.--

Signed and Sealed this

Twenty-third Day of March, 2010

David J. Kappos

David J. Kappos
*Director of the United States Patent and Trademark Office*